Patented Mar. 21, 1950

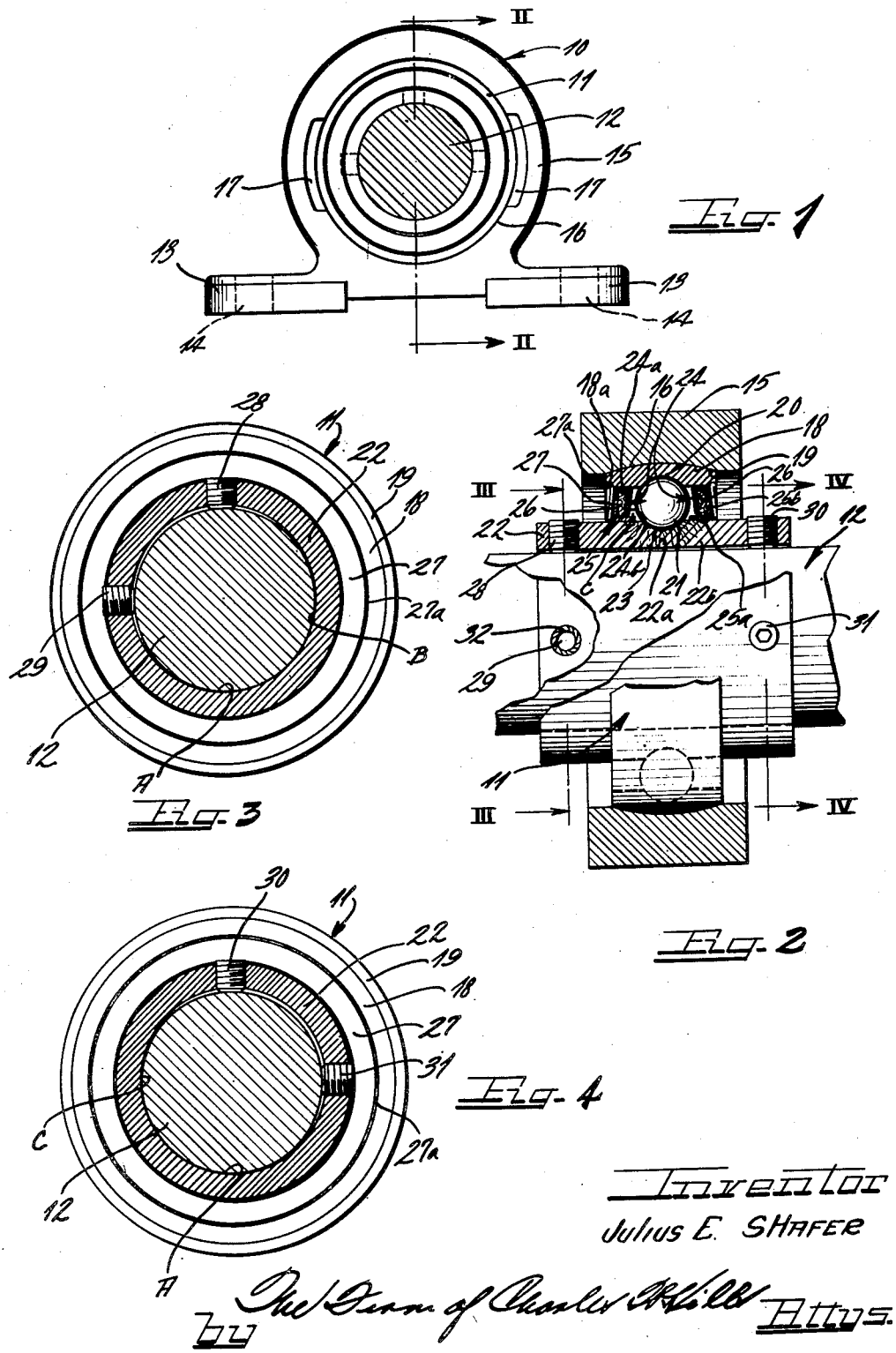

2,501,100

UNITED STATES PATENT OFFICE 2,501,100

BEARING ASSEMBLY

Julius E. Shafer, Chicago, Ill.

Application December 20, 1945, Serial No. 636,151

5 Claims. (Cl. 287—52.08)

This invention relates to bearing assemblies adapted to be fixedly locked on inserted members such as shafts without requiring the use of shaft adapters or other expensive locking rings.

Specifically, the invention deals with the locking of the inner race of a bearing onto a shaft by means of set screws threaded through the inner race ring.

This application is a continuation-in-part of my co-pending application entitled: "Bearing assembly," Serial No. 515,379, filed December 23, 1943 now U. S. Patent 2,419,691, issued April 29, 1947.

In my aforesaid parent Patent 2,419,691 there is disclosed and claimed a bearing assembly with an extended inner race ring having a pair of set screws threaded through each extended end thereof for gripping a shaft inserted through the rings. The set screws of each pair are arranged in 90° relationship with each other and the respective pairs of set screws at the opposite ends of the inner race ring are so positioned that a set screw on one end will be diagonally opposite a set screw on the other end. The inner race ring is hardened only at the raceway or ball groove portion thereof and this hardened raceway is cushioned in the softer and more resilient main body portion of the race ring. The set screws are threaded through this softer main body portion and the body portion can be subjected to cocking stresses without cracking. At the same time, the hardened raceway will effectively resist wear of the anti-friction elements or balls.

In the present invention, the same type of inner race ring is provided but the set screws are arranged so that at least one set screw at one end of the ring is in substantial axial alignment with a set screw at the other end of the ring. The other set screws are arranged in diagonally opposed relationship on opposite ends of the ring. The axially aligned set screws will act on a shaft inserted in the race ring to effect full seating engagement between the shaft and race ring along the length of the race ring on a portion thereof that is substantially opposite to the portion carrying the aligned set screws. If the shaft has a loose fit in the race ring, the diagonally opposed set screws then cock the race ring relative to the shaft when they are tightened against the shaft. The resulting assembly, therefore, includes the shaft in full seating engagement with a portion of the race ring along the entire length of the race ring and having diagonally opposite side portions also in engagement with the race ring near the ends of the race ring. This arrangement of set screws provides a different locking action in that the shaft and race ring are first seated in firm cradled relation along the entire length of the race ring, and are then cocked to actually wedge the seating relationship of the shaft and race ring, thereby preventing any possible loosening up of the assembly.

It is, then, an object of this invention to provide a bearing assembly for direct locking attachment to an inserted shaft or the like without the aid of separate shaft adapters or locking members.

A still further object of this invention is to provide a bearing with an extended inner race ring carrying locking screws that are so arranged to first firmly cradle an inserted shaft and then wedge the shaft into locked cradled relation in the ring.

A still further object of the invention is to provide a bearing lock arrangement for industrial bearing units wherein set screws act on a shaft inserted through the inner race ring of the bearing to place a portion of the inner race ring in firm seating engagement with the shaft along the entire length of the race ring and then wedge the race ring relative to the shaft to insure maintenance of the firm seating relationship.

A still further object of the invention is to provide an inner race ring of an industrial bearing unit with end portions that extend beyond the outer race ring of the unit and each carry a pair of set screws in 90° relationship with the first set screw of each pair being in substantially axial alignment, and the second set screw of each pair being in diagonal relation to the other set screw.

Another object of this invention is to provide a locking arrangement for shaft-receiving rings whereby the ring is drawn into firm seated engagement along its entire length with the inserted shaft and is then cocked relative to the shaft to lock the seating engagement.

Other and further objects of the invention will be apparent to those skilled in the art from the following detailed description of the annexed sheet of drawings which, by way of a preferred example only, illustrates one embodiment of the invention.

On the drawings:

Figure 1 is a side elevational view of a bearing assembly according to this invention illustrating a sealed bearing unit mounted in a one-piece pillow block.

Figure 2 is an enlarged vertical cross-sectional view taken substantially along the line II—II of Figure 1 and with parts shown in elevation.

Figure 3 is a transverse vertical cross-sectional view taken substantially along the line III—III of Figure 2.

Figure 4 is a transverse cross-sectional view taken substantially along the line IV—IV of Figure 2.

As shown on the drawings:

In Figure 1 the reference numeral 10 designates generally a one-piece pillow block having a sealed bearing unit 11 mounted therein with the bearing unit 11 receiving a shaft 12 therethrough. The pillow block 10 has feet 13—13 thereon with holes or slots 14—14 therethrough to receive bolts (not shown) for fixedly mounting the pillow block in position. An annular strap portion 15 is provided intermediate the feet 13—13 and this strap portion 15 has a concave segmental spherical inner face or bearing wall 16 as best shown in Figure 2.

As shown in Figure 1, slots or grooves 17—17 are formed on diametrically opposite sides of the strap portion 15 through the inner bearing wall thereof to receive the sealed bearing unit 11 therein when the unit is in a horizontal position. The unit, when inserted through the slots 17—17, can be tilted 90° into vertical position to be seated on and tiltably retained by the bearing wall 16 of the strap 15.

As best shown in Figure 2, the sealed bearing unit 11 includes an outer race ring 18 with a convex segmental spherical outer bearing wall 19 tiltably seated on the concave bearing wall 16 of the strap 15. A groove 20 is formed in the ring 18 to provide an outer race for ball bearings 21.

An inner race ring 22 is nested within the outer race ring 18 but extends on both sides thereof beyond the outer race ring. This inner race ring 22 has a groove 23 around the circumference thereof to provide an inner race for the ball bearings 21. The ball bearings 21 and races 20 and 23 cooperate to hold the rings 18 and 22 against relative axial movement but in radially spaced apart relation. The rings can rotate relative to each other on the ball bearings 21.

The outer race ring 18 can tilt in the strap 15 of the pillow block 10.

To provide a sealed ball chamber C between the race rings 18 and 22, retainers 24 are pressed into opposite ends of the outer race ring 18. These retainers have flat outer circular flanges 24a snugly fitting in the ring 18 together with radially inward and axially outward sloping flanges 24b projecting from the inner ends of the flanges 24a into spaced relation from the inner race ring 22. Flingers 25 are pressed on the inner race ring 22 and have base portions 25a projecting under and beyond the flanges 24b of the retainers 24 together with radially outward and axially inward sloping flange portions 25b in spaced parallel relation to the retainer flanges 24b. Felt sealing rings 26 are seated around the bases 25a of the fingers 25 and against the flanges 25b thereof. If desired, these sealing rings 26 can be cemented or otherwise bonded to the flingers 25. The sealing rings have close-running clearance relationship with the retainers 24. In addition, extra outer sealing members 27 are press-fitted into grooves 18a in the outer edges of the outer race ring 18 and overlie, in close-running clearance relationship, the flanges 25b of the flingers. These outer sealing members 27 preferably have outturned rounded edges 27a that can be easily snapped into the grooves 18a. These seals efficiently hold lubricant in the ball chamber C and prevent dirt from entering the ball chambers. As will be noted, before dirt can enter the ball chamber it must pass under the outer sealing member 27, thence outwardly between this member and the flinger flange 25b, and thence around the sealing ring 26 and inwardly against the action of centrifugal force to flow under the inner edge of the retainer flange 24b. This labyrinth path will effectively prevent entrance of dirt and also will effectively retain grease in the ball chamber.

The inner race ring 22 is preferably a high carbon high chrome steel such as 52,100 S. A. E. steel of about the following analysis:

.95 to 1.1% carbon;
.2 to .5% manganese;
.03% phosphorus;
.035% sulphur;
1.2 to 1.5% chromium;
balance iron.

The groove 23 around the inner race ring 22 is hardened by heating and quenching to provide a hardened portion 22a integral with and cushioned in a main body portion 22b of the ring. This localized hardening is accomplished by surrounding the groove 23 of the ring 22 with inductors energized by high frequency low voltage electric current to locally heat the grooved portion of the ring by hysteresis effect to the point of decalescence. At this temperature the hysteresis effect becomes negligible but further heating continues by eddy currents. As soon as the grooved portion 23 of the ring has been sufficiently heated, quenching fluid such as water, preferably containing caustic hydroxide solution, oil, or the like, is forced through nozzles provided in the inductors to immediately quench the localized heated portion and thereby form the hardened portion 22a. This hard portion 22a extends radially from the groove-defining wall as indicated by the wavy lines in Figure 2 and, if desired, can extend completely through the race ring 22 or to any desired depth in the race ring. The main body portion 22b of the ring is relatively unhardened, is less brittle, and much more resilient than the portion 22a.

The extended outer end portions of the race ring 22 each have two radially extending internally threaded holes therethrough spaced 90° apart. The holes are arranged so that a hole in one end of the ring is in substantial axial alignment with a hole in the other end of the ring, and so that the other holes at opposite ends of the rings are in diagonally opposed relation. As shown in Figures 2 and 3, the holes in the left-hand end of the ring receive, in threaded relation therein, socket head type set screws 28 and 29 while the holes in the right-hand end of the ring, as shown in Figures 2 and 4, receive similar set screws 30 and 31. The set screws 28 and 30 are in axial alignment. The set screws 29 and 31 are in diagonally opposed relation. Thus the left-hand end of the ring has the screw 29 disposed 90° to one side of the set screw 28 while on the other end of the ring the set screw 31 is disposed 90° from the other side of the set screw 30.

As shown in Figure 2, the set screws each have knurled or toothed rim ends 32 for biting into the shaft 12 which is inserted through the inner race ring 22.

In order to lock the inner race ring 22 on the shaft 12, the set screws 28 and 30 are first tightened against the shaft 12 to firmly seat the portion of the shaft opposite the screws into full engagement with the adjacent portion of the race ring 22 along the full length of the ring. Thus, as shown in Figures 3 and 4, the shaft 12 and race ring 22 are in full seating engagement along the bottom of the shaft for the full length of the ring as at "A." The shaft is thus cradled in a portion of the ring 22 along the full length of this portion. This cradled relationship is next firmly locked by tightening the set screws 29 and 31 against the shaft. Since these set screws are diagonally arranged on opposite ends of the race ring 22, if the shaft is loose or free-fitting in the ring 22, they will actually cock the ring relative to the shaft. Thus the set screw 29 will draw the race ring 22 tightly against a portion of the shaft opposite to the set screw as illustrated at B in Figure 3. The set screw 31 will draw the race ring 22 against the shaft at a portion opposite to the set screw as designated at C in Figure 4. The shaft will then have seated engagement with the ring along the portion A opposite the axially aligned set screws 28 and 30, along the portion B opposite the set screw 29, and along the portion C opposite the set screw 31. The cradled relationship at A between the shaft and race ring is firmly locked by cocking the race rings with the screws 29 and 31.

The set screws can be securely tightened to bite into the shaft 12 for fixedly locking the race ring on the shaft without any chance for looseness developing between the parts. The inner race ring 22 may be highly stressed by the load imposed on its through the tight set screw, but no difficulty is encountered because the resilient main body portion 22b of the ring can absorb these stresses without cracking while, at the same time, the hard portion 22a will effectively resist wear to provide a very hard race for the ball element 21.

In view of the above description of the preferred embodiment of this invention it will be evident that the invention provides an improved bearing assembly wherein the inner race ring of the bearing is securely locked on an inserted shaft by means of set screws which are so arranged to first cradle the shaft in the race ring and then cock the race ring to lock the cradled seating relationship between the shaft and race ring.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a bearing assembly having inner and outer race rings with complementary ball races therein and ball elements seated in said races holding said race rings in concentric spaced apart relatively rotatable relation, a housing tiltably supporting the outer race ring, and a shaft extending through the inner race ring, the improvement of a first pair of set screws in 90° relation threaded through one end portion of the inner race ring, and a second pair of set screws in 90° relation threaded through the other end portion of the inner race ring, one set screw at one end portion of said inner race ring being axially aligned with a set screw on the other end portion of the inner race ring, and the remaining set screws on opposite ends of the inner race ring being in diagonally opposed relation whereby the axially aligned set screws will cradle the shaft in the inner race ring along the entire length of the inner race ring and the diagonally opposed set screws will cock the race ring relative to the shaft to lock the cradled relationship of the shaft and race ring.

2. In a bearing assembly including a bearing mounting having a concave inner bearing face, an internally grooved outer race ring having a convex outer face tiltably mounted on the concave face of said mounting, an externally grooved one-piece inner race ring in said outer race ring, ball bearings riding in said grooves of the race ring holding the rings in rotatable axially fixed relation, and a shaft extending through the inner race ring, the improvements of said inner race ring extending beyond both end faces of the outer race ring, a first pair of set screws threaded radially through one end portion of the inner race ring, a second pair of set screws radially threaded through the other end portion of the inner race ring, the first set screw of each pair being in axial alignment, and the second set screw of each pair being in diagonally opposed relation, said axially aligned set screws acting on said shaft to bite into the shaft and place the shaft and inner race ring in cradled relation along the entire length of the race ring, and said diagonally opposed set screws acting on the shaft to bite into the shaft for cocking the race ring relative to the shaft to lock the cradled relationship of the shaft and race ring.

3. In a bearing assembly having a one-piece inner race ring receiving a shaft freely therethrough, the improvement of a shaft lock comprising axially aligned set screws threaded radially through opposite end portions of the inner race ring for biting into said shaft to place the portion of the race ring opposite the set screws in full cradled relation on the shaft along the entire length of the inner race ring, and additional set screws threaded radially through opposite end portions of the inner race ring for acting on the shaft to cock the race ring relative to the shaft and lock said cradled relationship between the shaft and race ring.

4. In a ball bearing assembly including an internally grooved outer race ring, an externally grooved inner race ring projecting through the outer race ring and extending outwardly from both sides of the outer race ring, a row of balls seated in said grooves and rotatably supporting the inner race ring from the outer race ring, and said inner race ring being composed of resilient metal with an integral locally hardened grooved area providing a hard race portion for the balls, the improvement of axially aligned locking screws threaded through the resilient extended end portions of the inner race ring for engaging a shaft inserted through the inner race ring, said screws having inner end portions adapted for biting into the inserted shaft to draw the portion of the race ring opposite the screws tightly against the shaft, whereby the resilient body of the inner race ring will absorb stresses imparted to the race ring by the screws and the shaft load so that the shaft load will be transmitted to the inner race ring through the hardened race area thereof and the screws to provide a three-point locked connection between the shaft and inner race ring.

5. In a bearing assembly including an outer race ring with an internal race, an inner race ring with an external race, said inner race ring projecting through the outer race ring and extending outwardly from both sides of the outer race ring, anti-friction elements between said race rings riding on said races thereof and rotatably supporting the inner race ring from the outer race ring, and said inner race ring being composed of resilient metal with an integrally locally hardened race area providing a hard race portion for the anti-friction elements, the improvement of axially aligned locking screws threaded through the extended end portions of the inner race ring for engaging a shaft inserted through the inner race ring to draw the portion of the race ring opposite the screws tightly against the shaft whereby the resilient body of the inner race ring will absorb stresses imparted by the screws and the shaft load so that the shaft load will be transmitted to the inner race ring through the hardened race area thereof and the screws.

JULIUS E. SHAFER.

REFERENCES CITED

The following references are of record in the file of this patent:

UNITED STATES PATENTS

| Number | Name | Date |
|---|---|---|
| 143,849 | Sanford | Oct. 21, 1873 |
| 866,184 | Brison | Sept. 17, 1907 |
| 1,326,892 | Reynolds | Dec. 30, 1919 |
| 2,230,045 | Boden | Jan. 28, 1941 |
| 2,419,691 | Shafer | Apr. 29, 1947 |